UNITED STATES PATENT OFFICE 2,501,645

VAT DYES OF THE ANTHRIMIDE CARBAZOLE ACRIDONE TYPE

Fritz Max, Easton, Pa., and David I. Randall, Phillipsburg, N. J., assignors to General Aniline & Film Corporation, New York, N. Y., a corporation of Delaware No Drawing. Application November 16, 1945, Serial No. 629,195

4 Claims. (Cl. 260—276)

The present invention relates to the preparation of new vat dyes of the anthrimide carbazole acridone type and to such dyes per se.

Vat dyes of the anthrimide carbazole acridone type are known to the art and in this connection reference may be made to U. S. P. 2,086,843. These dyes may be represented by the following formula:

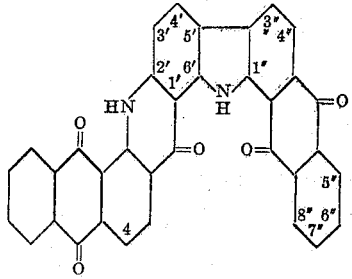

It has been proposed in U. S. P. 2,078,996 to produce dyes of the above formula in which, however, the 4″ and 5″ position is substituted by an aroyl amino group, such as a benzoyl amino group and the like. It is pointed out in the patent that these dyes dye vegetable fibers in dark shades of brown, such as dark brown, blackish brown, reddish brown, and the like.

It has now been discovered that dyes of the above type which contain in the 4-position thereof a benzoyl amino group dye vegetable fibers in olive shades. It is of course appreciated that the latter dyes are isomers of those described in U. S. P. 2,078,996. It was therefore to be expected that the dyeing properties thereof would be substantially the same. The fact, therefore, that the dyes containing a benzoyl amino group in the 4-position dye vegetable fibers olive rather than dark shades of brown is unexpected, to say the least.

It is, accordingly, an object of our invention to prepare anthrimide carbazole acridone dyes which dye vegetable fibers olive shades.

It is a further object of our invention to produce anthrimide carbazole acridone dyes containing in the 4 position thereof a benzoyl amino group.

It is a further object of our invention to produce anthrimide carbazole acridone dyes containing a benzoyl amino group in the 4 position and which may also contain an alkoxy or benzoyl amino group in the 4″ or 5″ positions or in both such positions.

Other and further important objects of our invention will be apparent as the description proceeds.

The compounds contemplated by our invention may be depicted by the following general formula:

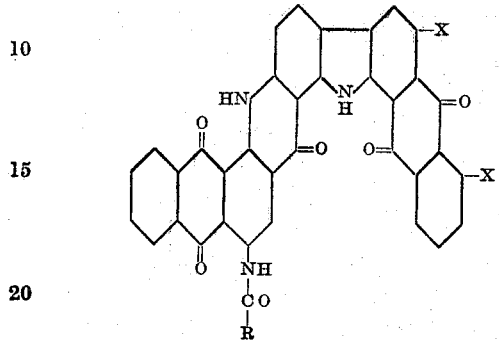

In this formula X is hydrogen, a benzoyl amino group or an alkoxy group, such as methoxy, ethoxy, propyloxy, butyroxy, octyloxy, stearyloxy, and the like. The phenyl radical of the benzoyl amino group may be unsubstituted or may be substituted by a halogen, such as chlorine, bromine, and the like; alkyl, such as methyl, ethyl, propyl, butyl, amyl, octyl, stearyl, and the like; alkoxy, as above, amino, such as primary amino, secondary amino, i. e., alkyl amino, such as methyl amino, ethyl amino, propyl amino, butyl amino, stearyl amino, and the like; aryl amino, such as phenyl amino, naphthyl amino, and the like; aralkyl amino, such as benzyl amino and the like; tertiary amino, such as dialkyl amino in which the alkyl groups are as above; diaryl amino in which the aryl groups are as above, diaralkyl amino where the aralkyl groups are as above; alkyl-aryl amino, such as methyl-phenyl amino, ethyl-naphthyl amino, ethyl-phenyl amino, and the like, carboxy, sulfo, etc. The substituents on the phenyl radical may appear in any free position of the phenyl ring, but preferably they are in para-position to the carbon atom to which the keto group is attached. R in the above formula may be phenyl or substituted phenyl as described above.

The products of the present invention are made by condensing 2.1 - (N) - 1'.2'-(N) -4-benzoyl-amino-6'-chlorobenzacridone with a 1-amino anthraquinone in which the 4- or 5- or both positions may be substituted by a benzoyl amino or an alkoxy group as above, and ring closing the condensation product with an acid condensing agent such as sulfuric acid, chlorsulfonic acid, or preferably aluminum or ferric chloride in a non-basic organic solvent such as nitrobenzene, nitrotoluene, dinitrobenzene, tetrachlorethane, chlorobenzene and the like. The condensation of the chlorobenzacridone and the amino anthraquinone is generally effected with an alkaline agent such as soda ash or potassium carbonate in the presence of copper or a copper salt such as copper acetate and the like while heating the reaction mixture.

The 2.1-(N)- 1'.2' -(N) - 4-benzoylamino-6'-chlorobenzacridone employed as the intermediate in the aforementioned reaction may be obtained by condensing 1-amino-2-sulfo-4-brom-anthraquinone with 2-amino-6-chlorobenzoic acid, converting the resulting condensation product into 4-amino-6-chlorobenzacridone by means of sulfuric acid monohydrate and amidating the amino group of said benzacridone with benzoyl chloride in the presence of an acid binding agent such as pyridine and the like.

Compounds which are within the scope of the present invention are typified by the following. It will be understood that in the compounds subsequently named, the products possess the following structure with the exception that in said structure are located the substituent groups in question.

(1)

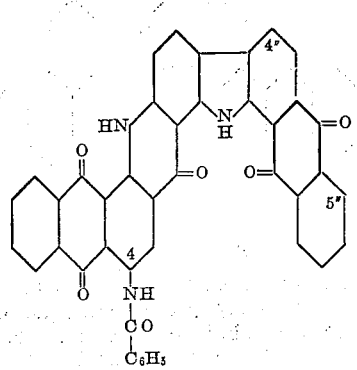

(2) This compound is like that of the above formula excepting that the 5'' position is substituted by benzoyl amino.

(3) This compound is like that of the above formula excepting that the 4'' position is substituted by benzoyl amino.

(4) This compound is like that of the above formula excepting that the 5'' position is substituted by methoxy.

(5) This compound is like that of the above formula excepting that the 5'' position is substituted by benzoyl amino and the 4'' position by ethoxy.

(6) This compound is like that of the above formula except that both the 4'' and 5'' positions are substituted by benzoyl amino.

(7) This compound is like that of the above formula excepting that the 4'' and 5'' positions are substituted by ethoxy.

(8) This compound is like that of the above formula excepting that the phenyl radical of the benzoyl amino group in the 4 position is substituted in para position by chlorine.

(9) This compound is like that of the above formula excepting that the phenyl radical of the benzoyl amino group in the 4 position is substituted in para position by methoxy and the 5'' position is substituted by benzoyl amino.

(10) This compound is like that of the above formula excepting that the 5'' position is substituted by benzoyl amino in which the phenyl radical contains in the para position a chlorine atom.

(11) This compound is like that of the above formula excepting that the 5'' position is substituted by toluoyl amino.

The dyes of the present invention are exceptionally fast, particularly to chlorine and light. They dye from a cold or warm vat and are suitable for printing fabrics by the usual methods.

If it be desired to increase the brightness of the dyeings obtained from the above dyes, this may be done by subjecting the dyes to hologenation. Chlorination may be effected, for instance, by reacting the dyes with sulfuryl chloride in the presence of iodine as in U. S. P. 2,086,843.

The following examples serve to illustrate the invention, but it is to be understood that the invention is not limited thereto. Unless otherwise indicated, the parts are by weight.

*Example 1*

350 parts of naphthalene, 32 parts of 1-amino anthraquinone, 7 parts of soda ash, 5 parts of copper acetate, 27 parts of anthraquinone 2.1-(N)-1'.2'-(N)-4-benzoyl amino-6'-chlorobenzacridone are stirred at 210° C. for 4 hours. After diluting the reaction mixture with 375 parts by volume of chlorobenzene and cooling the mixture to 30° C., the crystalline condensation product which forms is filtered off. The filter cake is washed with nitrobenzene, alcohol, dilute hydrochloric acid and water. The resulting anthrimide dissolves in concentrated sulfuric acid with a yellowish brown shade and dyes cotton blue gray shades.

39 parts of said anthrimide are dissolved in a solution of 350 parts by volume of nitrobenzene containing 105 parts of an anhydrous aluminum chloride. The reaction mixture is stirred while heating at 85° C. for 1 hour. The color of the solution changes from green to violet. The solution is then poured into 2000 parts of ice and water containing 50 parts of 36% hydrochloric acid. The nitrobenzene is removed by steam distillation and the crude dyestuff is filtered off. Cotton is dyed from a hydrosulfite vat by this product in strong olive shades of excellent fastness properties.

*Example 2*

5 parts of the olive dyestuff prepared according to the above example, 0.2 part of iodine, 8.5 parts of sulfuryl chloride, and 130 parts by volume of nitrobenzene are heated at 80° C. for four hours and then at 110° C. for two hours. Upon cooling the reaction mixture to 30° C., the chlorinated dyestuff is filtered and washed with nitrobenzene and alcohol. The dyestuff dyes cotton bright greenish olive shades from a violet hydrosulfite vat. The shade is greener and brighter than that obtained from the dyestuff of Example 1. The fastness properties of the dyeings are exceptionally good.

*Example 3*

8.7 parts of anthraquinone, 2.1-(N)-1'.2'-(N)-4-benzoyl amino-6'- chlorobenzacridone, 8 parts of 1-amino-5-benzoyl amino anthraquinone, 6 parts of sodium acetate, 0.5 part of copper acetate, and 130 parts of naphthalene are heated at 210° C. for four hours. The anthrimide is isolated as in Example 1. It is a dark powder which dyes cotton gray shades from a violet vat.

To a solution of 45 parts of an anhydrous aluminum chloride and 150 parts by volume of nitrobenzene, there are added 9.7 parts of the above anthrimide. After heating the reaction mixture at 85° C. for one hour, the color of the solution changes from blue green to olive. The solution is poured into 1000 parts of ice water and the dyestuff is worked up as in Example 1. It dyes cotton from a violet hydrosulfite vat in khaki shades of excellent fastness properties.

*Example 4*

The procedure is the same as in Example 3 except that the 1-amino-5-benzoyl amino anthraquinone is replaced by an equal quantity of 1-amino-4-benzoyl amino anthraquinone.

*Example 5*

The procedure is the same as in Example 3 except that the 1-amino-5-benzoyl amino anthraquinone is replaced by an equivalent weight of 1-amino-5-methoxy anthraquinone.

Various modifications of the invention will occur to persons skilled in the art and, therefore, I do not intend to be limited in the patent granted except as required by the prior art and the appended claims.

We claim:

1. Vat dyes capable of yielding olive shades of good fastness properties selected from the class consisting of those having the following formula:

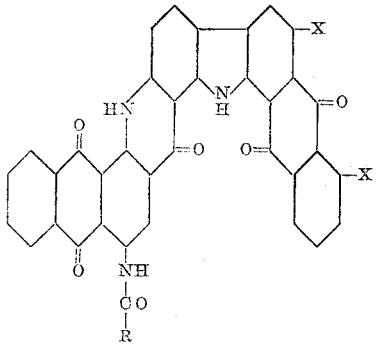

wherein X is a member of the class consisting of hydrogen, a benzoyl amino radical, and alkoxy and R is a phenyl radical, and such dyes produced by halogenation thereof.

2. The compound of the following structure:

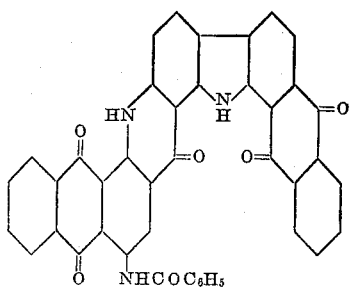

which dyes from a violet hydrosulfite vat strong olive shades of excellent fastness properties.

3. The halogenated dyestuff of claim 2.

4. The compound having the following constitution:

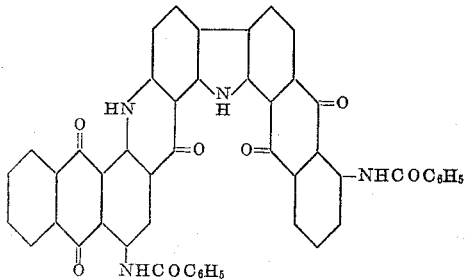

which dyes from a violet hydrosulfite vat strong khaki shades of excellent fastness properties.

FRITZ MAX.
DAVID I. RANDALL.

REFERENCES CITED

The following references are of record in the file of this patent:

UNITED STATES PATENTS

| Number | Name | Date |
|---|---|---|
| 1,850,482 | Ullmann | Mar. 22, 1932 |
| 2,005,321 | Kunz et al. | June 18, 1935 |
| 2,078,996 | Bauer | May 4, 1937 |
| 2,086,843 | Bauer | July 13, 1937 |
| 2,132,829 | Moser et al. | Oct. 11, 1938 |

OTHER REFERENCES

Barnett, "Anthracene and Anthraquinone," pages 8 and 9 (D. Van Nostrand Co.; New York, N. Y.; 1921).